US012643381B2

(12) United States Patent
Fisker et al.

(10) Patent No.: US 12,643,381 B2
(45) Date of Patent: Jun. 2, 2026

(54) VEHICLE HAVING RETRACTABLE MIDGATE

(71) Applicant: Fisker Inc., Manhattan Beach, CA (US)

(72) Inventors: Henrik Fisker, Manhattan Beach, CA (US); Seunghee Oh, Manhattan Beach, CA (US); Robert Dickie, Manhattan Beach, CA (US); Lawrence Thomas, Manhattan Beach, CA (US); Amy Dixon, Manhattan Beach, CA (US); Nadya Arnaout, Manhattan Beach, CA (US); Matthias Lang, Munich (DE)

(73) Assignee: Fisker IP/Austria Assets Trust, New York, NY (US)

( * ) Notice: Subject to any disclaimer, the term of this patent is extended or adjusted under 35 U.S.C. 154(b) by 25 days.

(21) Appl. No.: 18/758,922

(22) Filed: Jun. 28, 2024

(65) Prior Publication Data

US 2025/0001846 A1 Jan. 2, 2025

Related U.S. Application Data

(60) Provisional application No. 63/511,143, filed on Jun. 29, 2023.

(51) Int. Cl.
*B60J 5/12* (2006.01)
*B60J 1/18* (2006.01)
*E05F 15/665* (2015.01)

(52) U.S. Cl.
CPC ............... *B60J 5/12* (2013.01); *B60J 1/1861* (2013.01); *E05F 15/665* (2015.01); *E05Y 2201/644* (2013.01); *E05Y 2900/544* (2013.01)

(58) Field of Classification Search
CPC .......... B60J 5/12; B60J 1/1861; E05F 15/665; E05F 15/73; E05F 15/76; E05F 15/689; E05F 17/00; E05F 2017/005; E05Y 2201/644; E05Y 2201/22; E05Y 2900/544; E05Y 2900/532; E05Y 2900/55
USPC ......................................... 701/36, 45, 48, 49
See application file for complete search history.

(56) References Cited

U.S. PATENT DOCUMENTS

| | | | | |
|---|---|---|---|---|
| 6,260,916 B1 * | 7/2001 | Hunt | .................... | B62D 47/003 296/183.1 |
| 6,513,863 B1 * | 2/2003 | Renke | .................... | B60P 3/423 296/57.1 |
| 6,547,298 B2 * | 4/2003 | Sotiroff | .................... | B60J 7/04 410/129 |
| 6,837,529 B2 * | 1/2005 | Kharod | .................. | B60J 1/1853 296/183.1 |
| 6,851,741 B1 * | 2/2005 | Burg | ......................... | B60N 2/36 296/57.1 |
| 7,566,094 B2 * | 7/2009 | Polewarczyk | ......... | B60J 1/1861 296/190.11 |
| 10,350,972 B2 * | 7/2019 | Azzouz | .................... | B60J 5/00 |
| 11,999,274 B2 * | 6/2024 | Grant | .................... | B60J 1/1884 |

(Continued)

*Primary Examiner* — Hai H Huynh

(57) ABSTRACT

The technology disclosed herein enables retraction of a vehicle midgate into a cavity. In one example, a vehicle includes a passenger cabin, a cargo bed, and a midgate module positioned between the passenger cabin and cargo bed. The midgate module includes a window, and a midgate body. The window is configured to move from a closed position to an open position within a cavity of the midgate body. The midgate body is configured to move from a closed position to an open position within a cavity formed by the passenger cabin.

20 Claims, 4 Drawing Sheets

(56)             References Cited

U.S. PATENT DOCUMENTS

| | | | | |
|---|---|---|---|---|
| 12,195,101 B2* | 1/2025 | de Salvi | ................ | B60R 21/026 |
| 12,269,389 B2* | 4/2025 | Azzouz | ................ | B62D 33/037 |
| 2022/0363328 A1* | 11/2022 | Xin | ........................ | B62D 65/04 |

* cited by examiner

FIG. 3A    FIG. 3B

VEHICLE HAVING RETRACTABLE MIDGATE

RELATED APPLICATIONS

This application is related to and claims priority to U.S. Provisional Patent Application 63/511,143, titled "VEHICLE HAVING RETRACTABLE MIDGATE," filed Jun. 29, 2023, and which is hereby incorporated by reference in its entirety.

TECHNICAL FIELD

The present disclosure relates to the field of vehicle gates, and more specifically, for a vehicle having a retractable mid gate.

BACKGROUND

Conventional pickup trucks have a cabin for passengers and a bed for cargo. Conventionally pickup trucks have a wall that separates the cabin from the cargo bed.

Some prior art pickup trucks allow the wall to be manually removed or folded into the cabin to extend the bed cargo space into the cabin interior. In examples where the wall is moveable, the wall is conventionally known as a midgate. Prior art midgates that are removeable require the driver to leave their seat, separate the midgate the midgate from the vehicle, and find storage for the removed midgate. Prior art midgates that fold into the cabin interior reduce the cargo area in the cabin.

SUMMARY

The technology disclosed herein enables retraction of a vehicle midgate into a cavity. In one example, a vehicle includes a passenger cabin, a cargo bed, and a midgate module positioned between the passenger cabin and cargo bed. The midgate module includes a window, and a midgate body. The window is configured to move from a closed position to an open position within a cavity of the midgate body. The midgate body is configured to move from a closed position to an open position within a cavity formed by the passenger cabin.

These and other objects, features and advantages of the present invention will become more apparent from the following description when taken in connection with the accompanying drawings.

BRIEF DESCRIPTION OF THE DRAWINGS

FIGS. 3A-3B are illustrations of an exemplary embodiment of a retractable midgate.

DETAILED DESCRIPTION

Figure 1A:
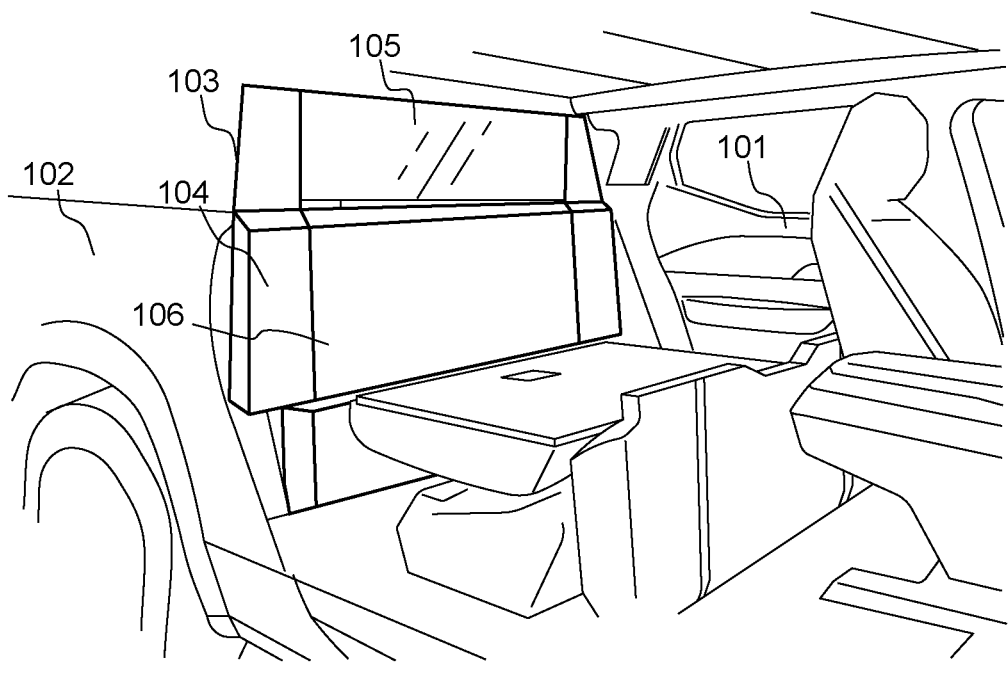
FIGS. 1A-1B are illustrations of an exemplary embodiment of a vehicle with a retractable midgate.
Figure 1B:
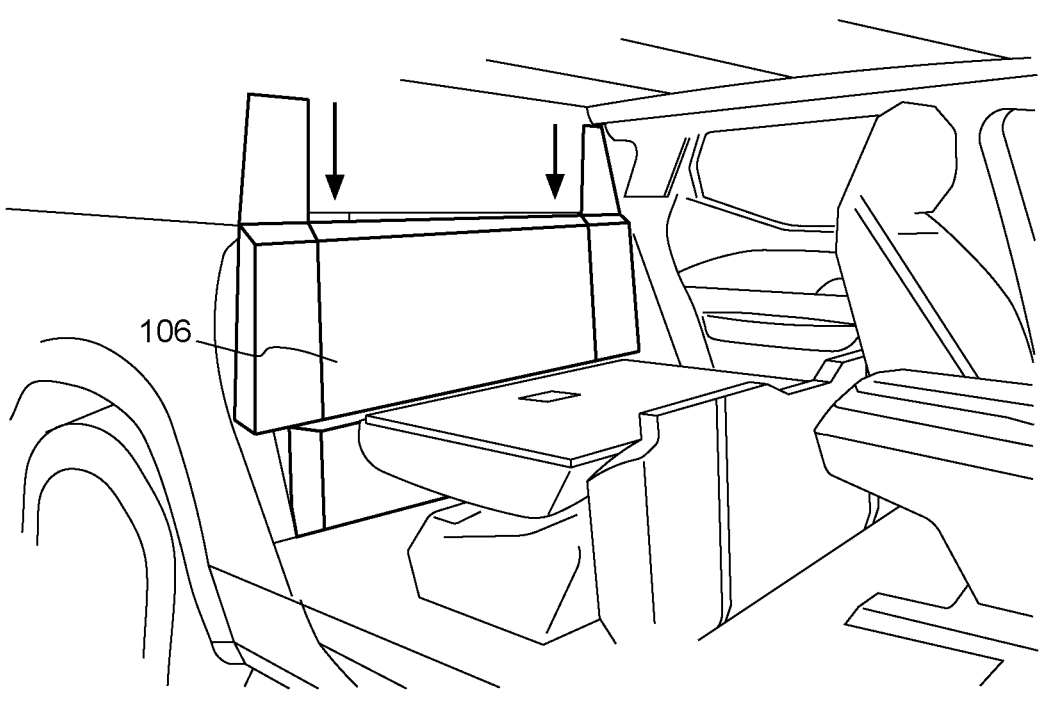
Figure 2:
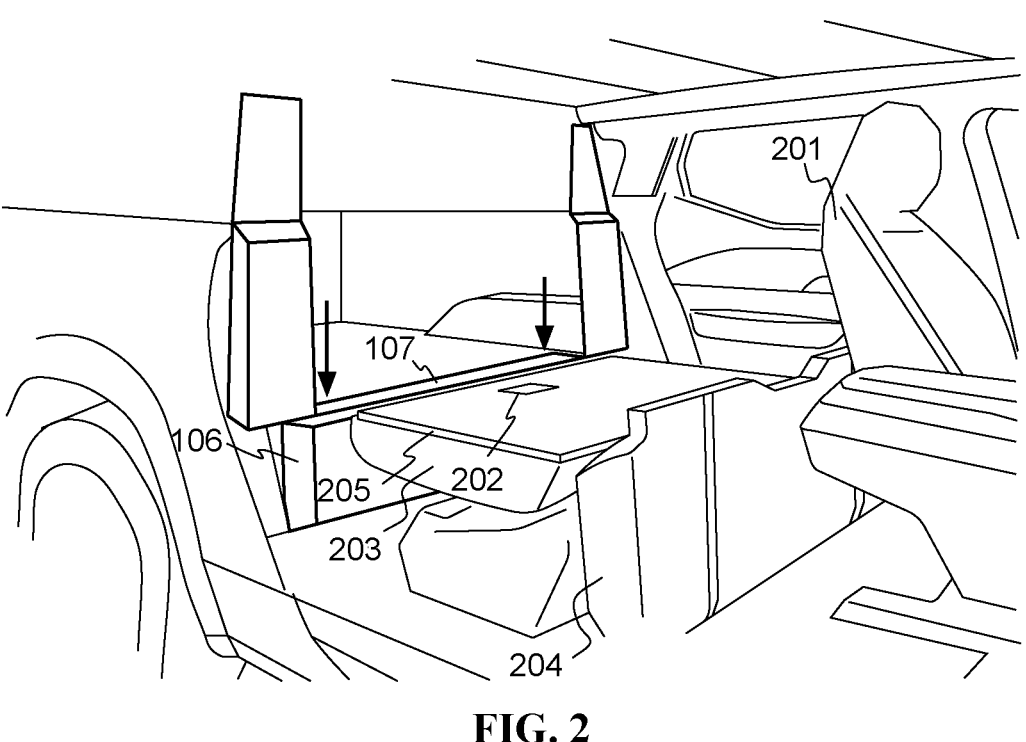
FIG. 2 is an illustration of an exemplary embodiment of a vehicle with a retractable midgate.

FIGS. 1A-2 are exemplary illustrations of a cutaway view of a vehicle 100. In an embodiment, the vehicle includes a cabin 101, a cargo bed 102, and a midgate module 103 positioned between the cabin and cargo bed. The midgate module 103 includes a midgate frame 104, a window 105, and a midgate body 106. The window 105 is configured to move from a closed position where the window 105 is raised, as illustrated in FIGS. 1A, to an open position where the window 105 is retracted within a cavity in the midgate body 106, as illustrated in FIG. 1B. The midgate body 106 is configured to move from a closed position where the midgate body is raised, as illustrated in FIGS. 1A, to an open position where the midgate body 106 is lowered along the midgate frame 104 into a retracted position inside of a cavity 107 of the vehicle 100, as illustrated in FIG. 2. The cavity 107 may be formed entirely within the cabin 101 or may be formed by space between the cabin 101 and the cargo bed 102.

Figure 4:
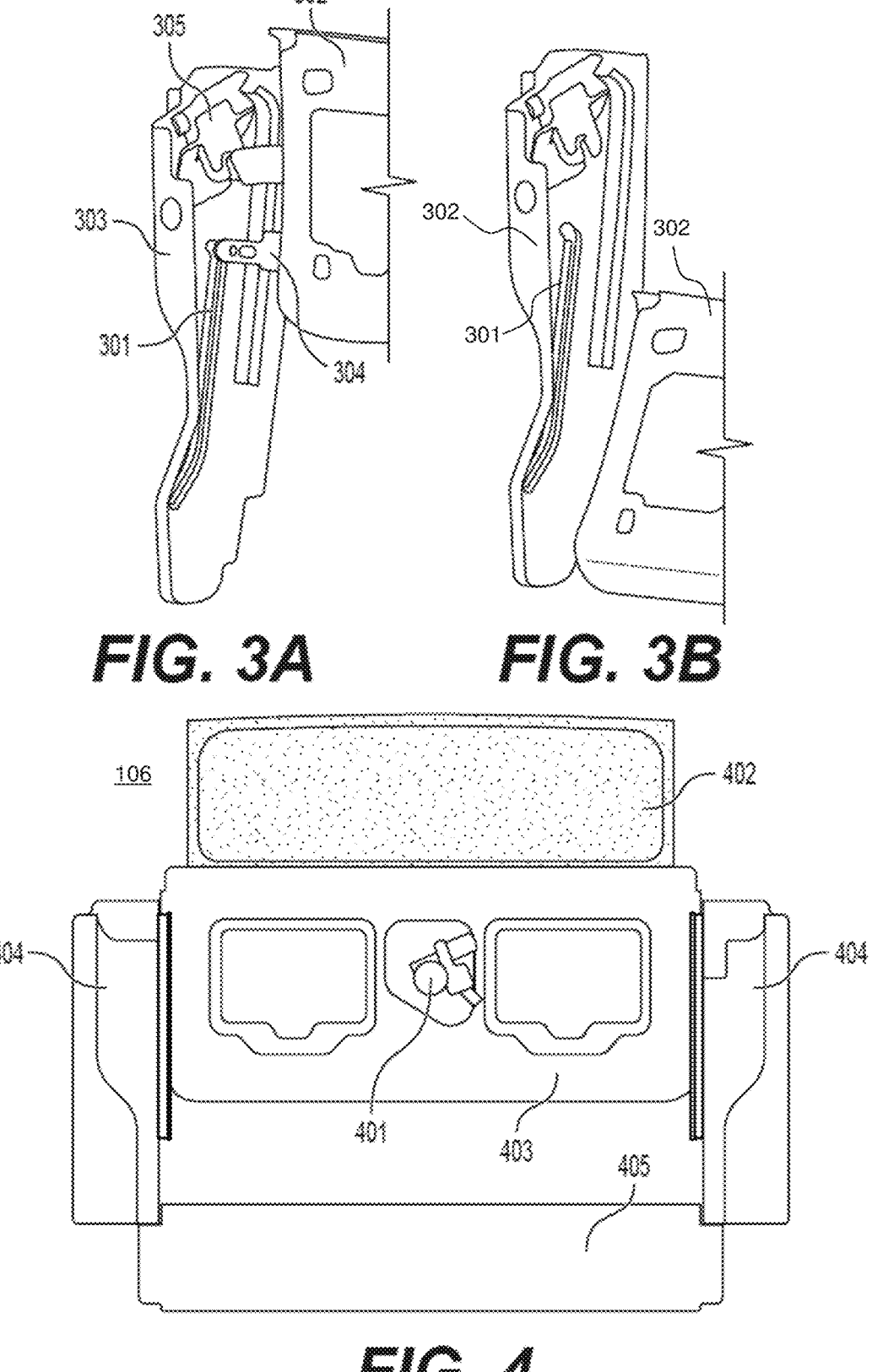
FIG. 4 is an illustration of an exemplary embodiment of a retractable midgate.

In some embodiments as illustrated in FIGS. 3A and 3B, the midgate module 103 may further include one or more midgate actuators 304 and one or more midgate rails 301. The midgate body 302 is lowered along the midgate rail 301 by the midgate actuator 304, as illustrated in FIGS. 3A-3B. The midgate body 302 may include one or more guides 306 such as a roller or wheels that move along the midgate rail 301. The midgate rail 301 may be configured to move the midgate away from the midgate frame 303 before or as the midgate body 302 is lowered. Moving the midgate body 302 away from the midgate frame allows the gate to separate from seals that may be positioned between the midgate body 302 and the midgate frame 303. The midgate actuator 304 may include one or more linear or rotary actuators, for example a motor. The motor may directly or indirectly drive the midgate body 302. The actuator may further include one or more cables, belts, chains, or spindles connecting the midgate. In some embodiments, the midgate body may be manually actuated between the open and closed position by a user. The midgate body 302 may include a handle which the user uses to manually actuate the midgate body. As illustrated in FIG. 4, the midgate frame may comprise two or more pillars 404 and one or more crossmembers 405.

In some embodiments, the midgate body module may further include one or more midgate window actuators 401, as illustrated in FIG. 4. The midgate window 402 is configured to be lowered inside of the midgate body 403 by the window actuator 401. The window actuator 401 may include one or more linear or rotary actuators, for example as a motor. The window actuator 401 may further include a window regulator driven by the linear or rotary actuator.

In some embodiments, the cabin further includes a front row 201 and a rear row 202 of seats. The rear row 202 may include a single bench seat, a split bench seat, or a plurality of bucket seats. The rear row includes one or more seatbacks 203 that are configured to be rotated forward and down from an upright position to a lowered position, as illustrated in FIG. 2. The rear row of seats includes one or more seat cushions 204 that may be configured to rotate forward and up from a seated position to a raised position, as illustrated in FIG. 2. Raising the seat cushions provides additional room for the seatbacks to fold downward and allows for a surface level with a floor of the cargo bed. In some embodiments a seat cover 205 is provided between the midgate module and the rear row seatbacks. The seat cover may be integrated into the rear row or may be a separate component. In embodiments where the seat cover is a separate component, it may be removably attached to the seatback, an unattached component, or it may be attached to the cabin and pivotable. The seat cover provides protection for the seats when folded down and a cargo surface level with the floor of the cargo bed.

In some embodiments, the rear row 202 may further include one or more rear row actuators. The rear row actuator may be configured to lower the seatback to the lowered position. The rear row actuator may also be configured to raise a seat cushion to the raised position. The rear row actuator may include one or more linear or rotary actuators, for example as a motor. The rear row actuator may include a latch that release the seatback or seat cushion from a fixed position. In some embodiments, when the latch releases the seatback or seat cushion, the seatback is lowered and/or the seat cushion is raised by a passive mechanism such as a spring.

Figure 5:
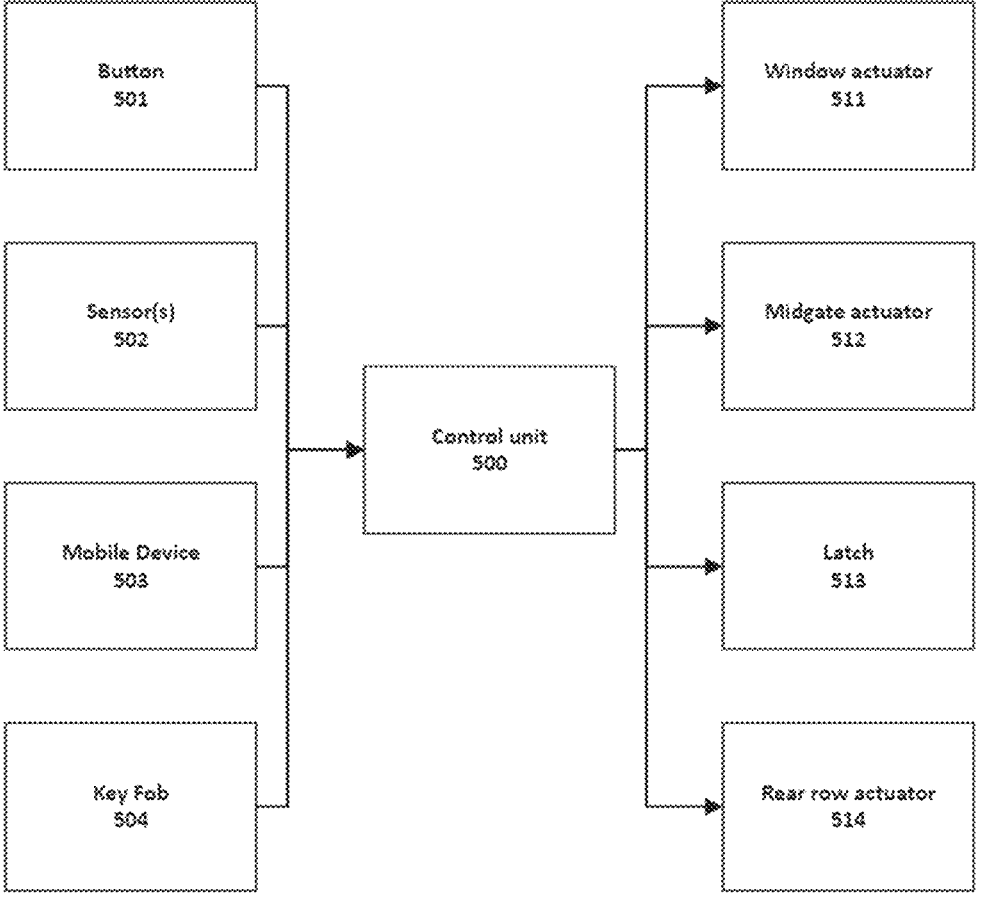
FIG. 5 is an illustration of an exemplary embodiment of a control unit.

In some embodiments as illustrated in FIG. 5, the vehicle includes a control unit 500 programmed to control the functions of the midgate module. The control unit may be a standalone control unit for the midgate module, a control unit that controls the function of multiple vehicle components, or a module or virtualization in another control unit of the vehicle. The control unit may include a processor, random access memory (RAM), storage, and input and output ports. The processor may be one or more microprocessors. The RAM functions as a work memory that temporarily stores data to be processed by processor. The storage is capable of saving information that has been put therein. The storage may include a read only memory (ROM) and a rewritable non-volatile memory. As the processor executes a program stored in storage, various types of control are carried out. Other vehicle control units may include the same hardware configuration as the control unit 500.

In some embodiments, the control unit 500 may send a signal to the window actuator 401/511 to raise and lower window 402, as illustrated in FIG. 4. The control unit 500 may send a signal to the midgate actuator 512 to raise and lower the midgate body 403. The control unit 500 may send signals to the window actuator 401 and midgate actuator to open and close the window 402 and midgate body 403 in sequence or simultaneously. The control unit 500 may prohibit the midgate body 403 from being opened when the window 402 is in the closed position. The control unit 500 may prohibit the window 402 from being closed when the midgate body 403 is in the open position. The control unit 500 may send a signal to the rear row actuator 514 to lower the seatback and/or raise the seat cushion. The control unit 500 may send a signal to the rear row actuator 514 simultaneous with the window actuator 511 and midgate actuator 512 or in sequence.

In some embodiments, the control unit 500 may receive a signal to open or close the window and midgate from one or more buttons 501. In some embodiments, the signal from the button 501 may also be to lower the seatbacks and/or raise the seat cushion. The button 501 may be a physical button, a button on a key fob, a touch sensitive button, or a software button in a graphical user interface on an instrument panel, mobile device, or other display. The button 501 may be located on the midgate body 106, the midgate frame 104, the cabin 101, the cargo bed 102 and/or elsewhere in the vehicle exterior or interior. In some embodiments, the control unit 500 may receive the signal to open or close the window and midgate body from a motion sensor 503/502. The motion sensor 502 may be an ultrasonic, infrared, optical, camera, LIDAR, or RADAR sensor. The motion sensor 502 may be located on the cabin 101, cargo bed 102, midgate module 103, or elsewhere on the vehicle 100. The motion sensor may be responsive to a motion from a user, for example a waving or kicking motion. The control unit 500 may also receive the signal to open or close the window and midgate from another vehicle control unit. The control unit may also receive the signal to open or close the window and midgate wirelessly from a mobile device 503 or key fob 504.

In some embodiments, the midgate module 103 includes one or more latches 305 configured to hold the midgate in the opened and/or closed position, as illustrated in FIG. 3A. The latch may be located on the midgate rail 301, or midgate body 302. The latch 513 may be actuated by the control unit 500 or another vehicle control unit. The latch may be automatically actuated by the motion of the midgate body 302. The latch may be automatically actuated in response to a vehicle event, for example a collision.

In some embodiments, the vehicle further includes a closure flap (not shown). The closure flap is moved into position over the opening of the cavity when the midgate has retracted. The closure flap may be actuated passively by the movement of the midgate. The closure flap may further be moved by a closure actuator, such as a motor. In embodiments where the closure flap is moved by the closure actuator, the closure actuator may be controlled by the control unit. The closure flap prevents debris and water from entering the cavity of the rear bumper when the midgate is in the open position.

It will be apparent to those skilled in the art that various modifications and variations can be made to the disclosed vehicle structures. While illustrative embodiments have been described herein, the scope of the present disclosure includes any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the present disclosure. It is intended, therefore, that the specification and examples be considered as exemplary only, with a true scope and spirit of the present disclosure being indicated by the following claims and their full scope of equivalents.

What is claimed is:

1. A vehicle comprising:
a passenger cabin;
a cargo bed; and
a midgate module positioned between the passenger cabin and the cargo bed, the midgate module comprising:
a window, and
a midgate body, wherein the window is configured to move from a closed position to an open position within a cavity of the midgate body, and the midgate body is configured to retract from a closed position to an open position within a cavity formed by the passenger cabin.

2. The vehicle of claim 1, wherein the midgate module further comprises:
a midgate frame;
at least one midgate rail; and
at least one midgate actuator, wherein the at least one midgate actuator is configured to move the midgate body between the closed position and the open position along the midgate rail.

3. The vehicle of claim 2, wherein the midgate actuator comprises:

a motor; and at least one a cable, belt, or chain coupled to the motor and the midgate body.

4. The vehicle of claim 2, further comprising a control unit configured to control the midgate actuator to move the midgate body between the closed and open positions.

5. The vehicle of claim 1, wherein:

the passenger cabin comprises a rear row, the rear row comprising at least one seat, and the at least one seat is configured to raise a cushion of the seat up and lower a seatback of the seat down.

6. The vehicle of claim 5, wherein the rear row further comprises a seat actuator configured to raise the cushion and/or lower the seatback.

7. The vehicle of claim 6, further comprising a control unit configured to control the seat actuator to move the cushion to a raised position and/or to move the seatback to a lowered position.

8. The vehicle of claim 5, wherein the passenger cabin further comprises a seat cover positioned between the rear row and the midgate, wherein the seat cover is configured to be lowered with the rear row and cover the rear row in the lowered position.

9. A method for controlling a midgate of a vehicle, the method comprising:

in a control unit for the vehicle, sending a signal to an actuator of the midgate, wherein the signal directs the actuator to actuate the midgate; and in the actuator, moving a body of the midgate up or retracting the body down in response to receiving the signal.

10. The method of claim 9, wherein, when retracting the body down, the body moves into an open position within a cavity formed in a passenger cabin of the vehicle.

11. The method of claim 9, wherein, when moving the body up, the body moves into a closed position creating a separation between a bed of the vehicle and a passenger cabin of the vehicle.

12. The method of claim 9, comprising:

in the control unit, sending a second signal to a window actuator for a window of the midgate, wherein the second signal directs the window actuator to actuate the window; and in the window actuator, moving the window up or down in response to receiving the second signal.

13. The method of claim 12, wherein, when retracting the window down, the window moves into the body.

14. The method of claim 13, wherein the second signal is sent prior to the signal, and wherein the control unit ensures the window is within the body prior to the body being moved.

15. The method of claim 12, wherein, when actuating the window up, the window closes a gap in a separation between a bed of the vehicle and a passenger cabin of the vehicle formed by the body.

16. The method of claim 15, wherein the control unit ensures the body is out of a cavity formed in a passenger cabin of the vehicle prior to the window being moved.

17. The method of claim 9, comprising:

in the control unit, sending a latch signal to actuate a latch configured to hold the body in position.

18. The method of claim 9, comprising:

in the control unit, sending a seating signal to a rear-row actuator, wherein the seating signal directs the rear-row actuator to fold rear-row seats of the vehicle up or down.

19. The method of claim 9, comprising:

in the control unit, receiving a button signal indicating a user of the vehicle is directing the control unit to actuate the midgate.

20. An apparatus for a vehicle midgate separating a bed of a vehicle and a passenger compartment of the vehicle, the apparatus comprising:

a window configured to move from a closed position to an open position within a cavity of a midgate body;

the midgate body configured to retract from a closed position to an open position within a cavity formed by a passenger cabin of the vehicle;

at least one midgate rail; and at least one midgate actuator configured to move the midgate body between the closed position and the open position along the at least one midgate rail.

* * * * *